United States Patent [19]

Zuckerbrod

[11] Patent Number: 4,888,256
[45] Date of Patent: Dec. 19, 1989

[54] SEPARATOR

[75] Inventor: David Zuckerbrod, Pittsburgh, Pa.

[73] Assignee: Westinghouse Electric Corp., Pittsburgh, Pa.

[21] Appl. No.: 222,587

[22] Filed: Jul. 21, 1988

[51] Int. Cl.$^4$ .............................................. H01M 2/16
[52] U.S. Cl. ...................................... 429/144; 429/59; 429/210; 429/248; 429/251
[58] Field of Search .................. 429/59, 144, 145, 210, 429/248, 251

[56] References Cited

U.S. PATENT DOCUMENTS

| 3,410,725 | 11/1968 | Harivel | 429/59 |
| 3,817,717 | 6/1974 | Kreidl et al. | |
| 3,877,985 | 4/1975 | Rampel | |
| 3,930,890 | 1/1976 | Dietz | |
| 4,078,893 | 3/1978 | Gilman et al. | |
| 4,091,185 | 5/1978 | Chireau et al. | 429/144 |
| 4,098,967 | 7/1978 | Biddick et al. | 429/210 |
| 4,180,624 | 12/1979 | Winsel | |
| 4,192,908 | 3/1980 | Hudy et al. | 429/144 X |
| 4,328,086 | 5/1982 | Takenaka et al. | |
| 4,339,325 | 7/1982 | Solomon et al. | |
| 4,352,865 | 10/1982 | Dirasquare | 429/144 X |
| 4,374,907 | 2/1983 | Chuang et al. | |
| 4,567,119 | 1/1986 | Lim | |
| 4,731,305 | 3/1988 | Goebel et al. | 429/210 X |

Primary Examiner—Stephen J. Kalafut
Attorney, Agent, or Firm—Joyce L. Morrison

[57] ABSTRACT

A bipolar battery intercell separator having three layers is disclosed. The two outer layers consist of a porous, hydrophobic, electrically conductive composite of carbon and a fluorocarbon binder hydrophobizing agent. The inner layer consists of a porous, hydrophobic, electrically conductive composite of carbon and a fluorocarbon binder hydrophobizing agent and a precious metal catalyst suitable for recombining hydrogen and oxygen at temperatures in the range of about $-30°$ to $+150°$ C. The precious metal catalyst is isolated from the electrolyte to prevent poisoning of the battery electrodes.

13 Claims, 1 Drawing Sheet

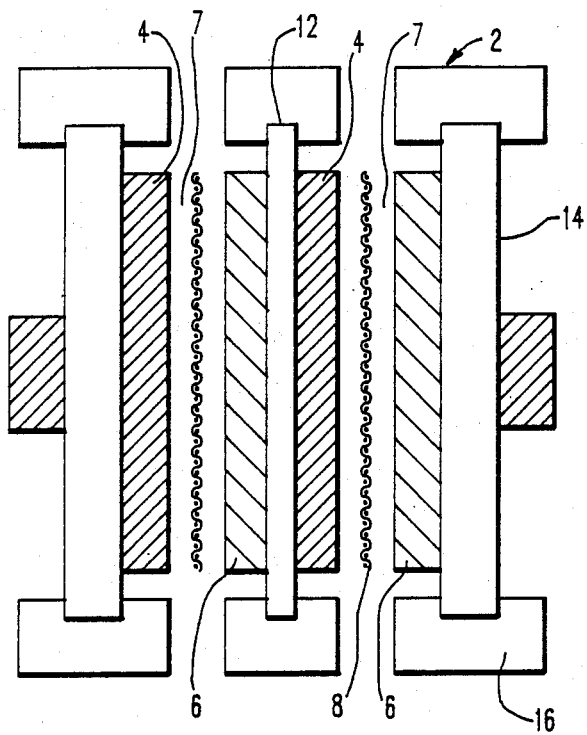

SEPARATOR

BACKGROUND OF THE INVENTION

1. Field of the Invention

The present invention relates to inter-cell separators in batteries.

2. Description of the Prior Art

Batteries that are to be used in space need to be reliable, maintenance free, have high weight and volume energy densities, and be able to operate without the aid of gravity. Generally, aqueous alkaline batteries have been used in space applications because of their high energy densities and the fact that the electrolyte concentration does not vary with the state-of-charge. Specifically, nickel-cadmium or nickel-hydrogen batteries have been used in this situation. See U.S. Pat. Nos. 3,877,985 and 4,567,119, for example.

In the nickel cadmium system, excess oxygen is evolved at the nickel electrode and diffuses through a porous unflooded separator to react at the cadmium electrode to form cadmium hydroxide, which is subsequently reduced to cadmium metal. If the capacity of the nickel electrodes is slightly less than the capacity of the cadmium electrodes, the products of overcharging a given cell are usually recombined into the reactants normally present in the cell.

In another example, the nickel hydrogen system is pressurized with hydrogen. Any oxygen produced at the nickel electrodes during charging will diffuse across the porous cell separator and be recombined with excess hydrogen to form water at the catalyzed hydrogen electrode. In both cases, oxygen may diffuse across the porous separator to react with the negative electrode material, thereby eliminating gas accumulation and restoring lost electrolyte. See U.S. Pat. Nos. 3,817,771 and 4,087,893.

When higher power and energy densities are required, silver electrodes have been used to replace the nickel electrodes. However, silver oxide has a higher solubility in the electrolyte than nickel oxide. Thus, a much less porous diffusion barrier must be included in the cell separator in order to avoid migration of silver to the negative electrode. However, this also limits gas diffusion and subsequent recombination which in turn limits its application in space. Furthermore, high rate cells usually have thinner electrodes and electrolyte gaps, which further exacerbates the migration and recombination problems.

For high rate batteries, it is preferred that such cells are usually connected in a series in a bipolar stack configuration. In such an array, if gas displaces the electrolyte in a single cell, the resistance of the entire battery is increased and the whole device may become electrically open with the full battery voltage appearing across that cell, resulting in a reduction in dependability.

In large, thin, high rate cells, electrolyte circulation is not practical due to the complexity, propensity to leak and the reduction in cell performance due to shunt currents, which are parasitic currents between cells through the electrolyte circulation channels. Therefore, external recombination of cell gases may be precluded because in space there is no means for gas disengagement from the electrolyte. Gas recombination must take place over the entire cell area, as is the case where gas diffusion occurs through intercell separators.

Many types of intracell gas recombination elements and gas permeable separators are known, some of which include polytetrafluoroethylene-carbon combinations. See for example, U.S. Pat. Nos. 4,374,907; 4,339,325; and 3,930,890. However, these are not useful for space applications due to limitations such as requiring gravity to function and/or the need to resist silver ion migration while providing reactant gas recombination.

In spite of these disclosures there remains a need for a bipolar battery, especially a silver oxide iron battery, that can be used in space and be reliable, maintenance free, have high energy densities and provide gas recombination without destroying the cell.

SUMMARY OF THE PRESENT INVENTION

The present invention has met the above-described need by providing a bipolar aqueous battery that contains an intercell separator that recombines gases without destroying the cell.

The intercell separator has three layers, a first, outer layer and an third, outer layer each of which are preferably a composite of a porous hydrophobic and electrically conductive substance, preferably a composite of carbon and a fluorocarbon binder/hydrophobic agent. The second, inner layer is a porous, hydrophobic composite of carbon catalyzed with a precious metal and a binder/hydrophobizing agent.

Specifically the two outer layers consist of a porous, hydrophobic, electrically conductive composite of carbon and a fluorocarbon binder/hydrophobizing agent. The second, inner layer differs from the two outer layers in containing a precious metal catalyst suitable for recombining hydrogen and oxygen at temperatures in the range of about $-30°$ C. to $+150°$ C.

The precious metal catalyst should be isolated from the electrolyte in order to resist poisoning of the battery electrodes. The electrode may be poisoned by the deposition of precious metal on the negative electrode resulting in an over-voltage decrease for hydrogen evolution.

It is an object of the present invention to provide a intercell separator that may be used in a bipolar aqueous battery.

It is a further object of the present invention to provide a bipolar battery that may be used in space.

It is another object of the present invention to provide an internal recombination of gases in a bipolar aqueous battery.

It is a further object of the present invention to provide a three layer separator.

It is an object of the present invention to provide a method of recombining hydrogen and oxygen in a bipolar aqueous cell using a separator of the present invention.

These and other objects of the present invention will be more fully understood from the following illustration description of the invention.

BRIEF DESCRIPTION OF THE DRAWING

The FIGURE is a schematic illustration of a presently preferred battery of the present invention.

DESCRIPTION OF THE PREFERRED EMBODIMENTS

All sealed recombination batteries need to pass gas through an internal separator or recombine gas at some area above the electrolyte in order to function. Most of these systems are dependent upon gravity for elimination or recombination of the gases. However, in space, gravity is not available and furthermore, external recombination is problematic.

It is preferred that the separator consists of three layers. The first and third outer layers each consist of a porous, hydrophobic, electrically conductive composite of carbon and a fluorocarbon binder/hydrophobizing agent. The inner second layer is a porous, hydrophobic, electrically conductive composite of carbon catalyzed with a precious metal catalyst suitable for recombination of hydrogen and oxygen at temperatures in the range of −30° to +150° C. and a fluorocarbon binder/hydrophobizing agent. The outer layers carry the electric current, allow cell gases to pass through to the inner catalyst, allow water vapor produced by the recombination reaction to pass through to the electrolyte and serve to isolate the precious metal catalyst from the electrolyte in order to prevent poisoning of the battery electrodes.

The second inner layer carries the electrical current and catalyzes the recombination of hydrogen and oxygen and oxygen into water vapor.

The outer layers are laminated to the inner layer in order to form a structure with sufficient mechanical integrity for assembly and edge sealing. Edge sealing is accomplished with an adhesive resistant to the strongly alkaline electrolyte (i.e., epoxy or neoprene based adhesives). The separators are sealed to the electrically insulating inert battery case.

The intercell separator is formed from two outer layers of carbon and a fluorocarbon hydrophobizing/binder such as polytetrafluoroethylene (PTFE) and a second inner layer having a precious metal catalyst carbon and a fluorocarbon hydrophobizing/binder layer.

The polytetrafluorethylene of the invention is preferably in powder form with a particle size of about 350 to 650 microns and is sold under the trade designation Teflon 6C. Ammonium bicarbonate, suspended in petroleum ether, sold under the trade designation Shell-sol, is added in an amount of about 10 to 20 times the weight of carbon. The ammonium bicarbonate is a pore former which evaporates during subsequent heat treatment of the electrode. The Shell-sol is added to give the proper consistency to the mixture.

The ratio of carbon to PTFE in the outer layers is preferably about 9:1 to 7:3. The inner layer preferably has a carbon to PTFE ratio of about 63:30 to 45:50. The precious metal catalyst is present in the inner layer in an amount of about 5 to 7 weight percent.

The carbon of the inner layer serves as a conductive substrate for the precious metal catalyst. The carbon serves to maintain high precious metal catalyst surface area, while minimizing the weight of platinum necessary for the reaction. Platinum or a platinum alloy are preferred as the catalyst for the gas phase reaction, i.e. the combination of oxygen and hydrogen into water. Suitable platinum alloying constituents include chromium, vanadium and titanium. The preferred carbon is Schawingan Vulcan, Ketchen, Black Pearls and mixtures thereof.

The PTFE serves as a binder and hydrophobizing agent. The PTFE comprises about 30-50 wt. % of this material.

The components are blended and then rolled to give thin sheets of the material. The final thickness of the material may be from 10 to 17 mils to give, a platinum loading of from about 0.3 to 0.45 milligrams Pt/cm$^2$. This material is then laminated between two porous hydrophobic supports. The supports consist of graphite paper, such as that sold under the trade designation Stackpole PC 206, which has been impregnated with a dispersion of fluorinated ethylene propylene (FEP). The resulting structure is sintered in an inert atmosphere at about 350°-370° C.

Referring to the FIG. 1, the separator is preferably housed in a bi-polar battery that has a housing (not shown). Anodes 4 and cathodes 6 are disposed within the housing in a generally parallel spaced relationship. The intra-cell separator 8 is disposed between the anode 4 and cathode 6, forming an interelectrode space 7 in the cell.

The intracell separator 8 is composed of a microporous insulating material such as for example, ABS, PVC, cellophane, polyolefins, mixtures thereof and the like. The cathode 6 of one cell unit is disposed in a generally proximate relationship to the anode of another adjoining cell unit. The intercell separator 12 of the present invention is disposed between the anode 4 of one cell unit and the cathode 6 of the adjoining cell unit in a generally intimate relationship. An end plate and terminal 14 is disposed at one end of the cell. Cell case rings 16 secure the entire cell.

The function of the separator is to recombine gases generated on the positive electrode with gases generated by the negative electrode from the adjacent cells and similarly gases generated by the negative electrode by gases generated by the positive electrode on the adjacent cell on the other side.

When the separator is used in a bipolar battery, the intercell separator must be both electronically conducting and impervious to electrolyte penetration.

It will be appreciated that the above-described invention provides an intercell separator that recombines cell gases produced during the charging of a high rate bipolar battery in space. This bipolar battery and associated separator are preferred when an intracell separator will not support gas diffusion, such as when silver positive electrodes are used or in gravity-free environment where gas disengagement is difficult. The inter-cell separator recombines gases produced during the routine overcharging normally needed to keep high rate alkaline cells at full capacity. The battery volume and pressure requirements are kept to a minimum and charging conditions may be selected for optimum performance.

Whereas, particularly embodiments of the invention have been described above for purposes of illustration, it will be appreciated by those skilled in the art that numerous variations of the details may be made without departing from the invention as described in the appended claims.

I claim:

1. An intercell separator suitable for use in bipolar batteries comprising:

a first outer layer of composite of a electrically conductive substance and a hydrophobic polymeric substance;

a second inner layer of a porous hydrophobic composite catalyzed with a precious metal;

a third outer layer of a composite of a electrically conductive substance and a hydrophobic polymeric substance; and said first and third outer layers being laminated to said inner layer.

2. The separator of claim 1 wherein the first and third outer layers consist of a composite of carbon and polytetrafluoroethylene.

3. The separator of claim 1 wherein said precious metal catalyst combines hydrogen and oxygen at a temperature of about −30° C. to 150° C.

4. The separator of claim 3 wherein said second inner layer is a composite of carbon and polytetrafluoroethylene and the catalyst is platinum or a platinum alloy.

5. The separator of claim 2 wherein the carbon to polytetrafluoroethylene is present in a ratio of about 9:1 to 7:3.

6. The separator of claim 3 wherein the carbon to polytetrafluoroethylene is present in a ratio of about 63:30 to 45:50 and the precious metal catalyst is present in an amount of about 5 to 7 weight percent.

7. A bipolar battery comprising:
a housing;
a first anode disposed within the housing;
a first cathode disposed within the housing and in a spaced relationship with said first anode forming an interelectrode space;
an intra-cell separator disposed within the interelectrode space;
a second anode disposed within said housing and in a general proximate relationship with said first cathode;
a second cathode disposed within said housing and in a spaced relationship with said second anode; and
the separator of claim 1 disposed between said second anode and said first cathode.

8. The battery of claim 7 wherein battery is used in a gravity free environment.

9. The separator of claim 7 wherein the first and third outer layers consist of a composite of carbon and polytetrafluoroethylene.

10. The separator of claim 6 wherein said precious metal catalyst combines hydrogen and oxygen at a temperature of about −30° C. to 150° C.

11. The separator of claim 9 wherein said second inner layer is a composite of carbon and polytetrafluoroethylene and the catalyst is selected from the group consisting of platinum and platinum alloys.

12. The separator of claim 9 wherein the carbon to polytetrafluoroethylene is present in a ratio of about 9:1 to 7:3.

13. The separator of claim 12 wherein the carbon to polytetrafluoroethylene is present in a ratio of about 63:30 to 45:50 and the catalyst is present in an amount of about 5 to 7 weight percent.

* * * * *